United States Patent
Ginsberg et al.

(10) Patent No.: US 10,939,477 B2
(45) Date of Patent: Mar. 2, 2021

(54) SERVICE TOOL WIRELESS ACCESS MANAGEMENT

(71) Applicant: Otis Elevator Company, Farmington, CT (US)

(72) Inventors: David Ginsberg, Granby, CT (US); Fred G. Williams, Old Saybrook, CT (US); Mark Olthuis, Avon, CT (US); Sandeep Sudi, Farmington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 9 days.

(21) Appl. No.: 15/882,225

(22) Filed: Jan. 29, 2018

(65) Prior Publication Data

US 2019/0239258 A1 Aug. 1, 2019

(51) Int. Cl.
| | |
|---|---|
| *H04W 76/10* | (2018.01) |
| *B66B 5/00* | (2006.01) |
| *B66B 1/34* | (2006.01) |
| *H04W 48/16* | (2009.01) |
| *H04W 92/18* | (2009.01) |

(52) U.S. Cl.
CPC ........... *H04W 76/10* (2018.02); *B66B 1/3461* (2013.01); *B66B 5/0087* (2013.01); *H04W 48/16* (2013.01); *H04W 92/18* (2013.01)

(58) Field of Classification Search
CPC .................................................... B66B 1/3461
See application file for complete search history.

(56) References Cited

U.S. PATENT DOCUMENTS

| | | | |
|---|---|---|---|
| 7,426,981 B2 | 9/2008 | Bacellar et al. | |
| 7,607,516 B2 | 10/2009 | Simon et al. | |
| 2012/0175196 A1 | 7/2012 | Hughes et al. | |
| 2014/0045479 A1* | 2/2014 | Shinada | H04W 52/04 455/418 |
| 2014/0050133 A1* | 2/2014 | Jafarian | H04W 74/085 370/311 |
| 2014/0069745 A1* | 3/2014 | Dellarippa | B66B 1/34 187/381 |

(Continued)

FOREIGN PATENT DOCUMENTS

| | | |
|---|---|---|
| CN | 102765643 | 6/2015 |
| CN | 105923484 | 9/2016 |

(Continued)

OTHER PUBLICATIONS

AVM: "Fritz! Box 3272 Service", Sep. 15, 2017, pp. 1-2, Retrieved from the Internet: URL: https://web.archive.org/web/20160915034026/ https://en.avm.de/serivce/fritzbox/fritzbox-4020/knowledge-base/ publicationishow/106-Setting-up-the-FRITZ-Box-for-use-with-another-router/ [retrieved on Jun. 11, 2019] (2 pp.).

(Continued)

*Primary Examiner* — Marcus Smith
(74) *Attorney, Agent, or Firm* — Cantor Colburn LLP

(57) ABSTRACT

A service tool wireless access management system includes a wireless access interface and an equipment service system comprising at least one processor. The at least one processor is configured to enable the wireless access interface responsive to a wireless access request initiated through a service tool, establish a wireless communication session with the service tool through the wireless access interface, and disable the wireless access interface responsive to a wireless communication termination event.

16 Claims, 6 Drawing Sheets

(56) References Cited

U.S. PATENT DOCUMENTS

| | | | | |
|---|---|---|---|---|
| 2015/0229516 A1* | 8/2015 | Thanos | | H04L 41/0809 370/254 |
| 2015/0304950 A1* | 10/2015 | Li | | H04W 52/0216 370/311 |
| 2015/0329316 A1* | 11/2015 | Lee | | B66B 1/2458 187/384 |
| 2016/0239001 A1* | 8/2016 | Chin | | G05B 15/02 |
| 2017/0088397 A1* | 3/2017 | Buckman | | H04W 4/80 |
| 2017/0201941 A1* | 7/2017 | Park | | H04W 52/0209 |
| 2017/0291800 A1 | 10/2017 | Scoville et al. | | |
| 2018/0302937 A1* | 10/2018 | Nieminen | | H04W 76/10 |
| 2018/0370759 A1* | 12/2018 | Hattori | | B66B 3/00 |
| 2018/0370761 A1* | 12/2018 | Huang | | B66B 1/3461 |
| 2019/0020971 A1* | 1/2019 | Ginsberg | | H04L 67/34 |
| 2019/0026966 A1* | 1/2019 | Varelius | | B66B 1/468 |
| 2019/0276272 A1* | 9/2019 | Cortona | | H04W 76/10 |

FOREIGN PATENT DOCUMENTS

| | | |
|---|---|---|
| CN | 106744111 | 5/2017 |
| CN | 106946108 | 7/2017 |
| CN | 206336872 | 7/2017 |
| EP | 3124418 | 2/2017 |
| WO | 2017064637 | 4/2017 |
| WO | 20170125255 | 7/2017 |

OTHER PUBLICATIONS

European Patent Office, Extended European Search Report, Application No. 19154240.6-1231, dated Jun. 19, 2019 (9 pp.).

Via: "VIA Alegro 100", Feb. 24, 2017, XP055595606, Retrieved from the Internet: URL: https://web.archive.org/web/20170224074748/https://www.viatech.com/en/solutions/via-iot-studio/via-alegro-100/ [retrieved on Jun. 11, 2019] (7 pp.).

\* cited by examiner

SERVICE TOOL WIRELESS ACCESS MANAGEMENT

BACKGROUND

The present disclosure relates to equipment service systems, and more particularly, to service tool wireless access management.

Current service tools used for accessing equipment controllers (e.g., elevator controllers) typically rely on using a separate hardware tool that physically plugs into an equipment control system. The physical connection ensures that the service tool is used by an individual who is physically present at a specific location when using the service tool. Being physically present helps to ensure that a user of the service tool can observe environmental conditions, such as the presence of other people. As networked/wireless service tools are used in place of physically connected service tools, a wireless network interface is desirable. Keeping a wireless network interface active to communicate with a wireless-enabled service tool at the location of the equipment consumes power even if the wireless network interface is only used occasionally for servicing events.

BRIEF DESCRIPTION

According to some embodiments, a service tool wireless access management system is provided. The service tool wireless access management system includes a wireless access interface and an equipment controller of an equipment service system. The equipment controller includes at least one processor configured to enable the wireless access interface responsive to a wireless access request initiated through a service tool, establish a wireless communication session with the service tool through the wireless access interface, and disable the wireless access interface responsive to a wireless communication termination event.

In addition to one or more of the features described above or below, or as an alternative, further embodiments may include where the wireless access request is relayed from the service tool through a remote server to the at least one processor via one or more communication pathways.

In addition to one or more of the features described above or below, or as an alternative, further embodiments may include a plurality of equipment components of the equipment service system having an associated instance of the wireless access interface enabled responsive to the wireless access request.

In addition to one or more of the features described above or below, or as an alternative, further embodiments may include where the equipment controller is an elevator controller, and the wireless communication session provides the service tool with access to one or more functions of the elevator controller.

In addition to one or more of the features described above or below, or as an alternative, further embodiments may include where the wireless access interface includes a first wireless access interface of the equipment controller, and the wireless access request is received on a second wireless access interface of the equipment controller, the second wireless access interface having a reduced wireless communication range relative to the first wireless access interface.

In addition to one or more of the features described above or below, or as an alternative, further embodiments may include where the at least one processor is further configured to enable the wireless access interface responsive to an input received at a user interface of the equipment controller.

In addition to one or more of the features described above or below, or as an alternative, further embodiments may include where a location of the service tool within a communication range threshold of the wireless access interface is confirmed before enabling the wireless access interface.

In addition to one or more of the features described above or below, or as an alternative, further embodiments may include where the wireless communication termination event comprises one or more of: a timeout period elapsing between enabling the wireless access interface and establishing the wireless communication session, detecting that the service tool is outside of a communication range threshold of the wireless access interface, a timeout period elapsing since a last completed communication of the wireless communication session, a disable command received from the service tool, and an operating mode transition to a primary operating from an auxiliary operating mode of the equipment controller.

In addition to one or more of the features described above or below, or as an alternative, further embodiments may include where the wireless access interface is enabled responsive to a transition of the equipment controller from the primary operating mode to the auxiliary operating mode, wherein the transition is based on a condition detected at one or more of: an input interface, a restricted-access interface, a scanner interface, and at least one sensor.

In addition to one or more of the features described above or below, or as an alternative, further embodiments may include where the wireless access request includes a request identifier, and enablement of the wireless access interface is further conditioned on determining that the request identifier matches an identifier associated with the equipment controller.

According to some embodiments, a method of service tool wireless access management is provided. The method includes enabling a wireless access interface of an equipment service system responsive to a wireless access request initiated through a service tool. A wireless communication session with the service tool is enabled through the wireless access interface, and the wireless access interface is disabled responsive to a wireless communication termination event.

Technical effects of embodiments of the present disclosure include selectively enabling and disabling a wireless access interface proximate to a service location for establishing a wireless communication session with a service tool as needed.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

A detailed description of one or more embodiments of the disclosed apparatus and method are presented herein by way of exemplification and not limitation with reference to the Figures.

Figure 1:
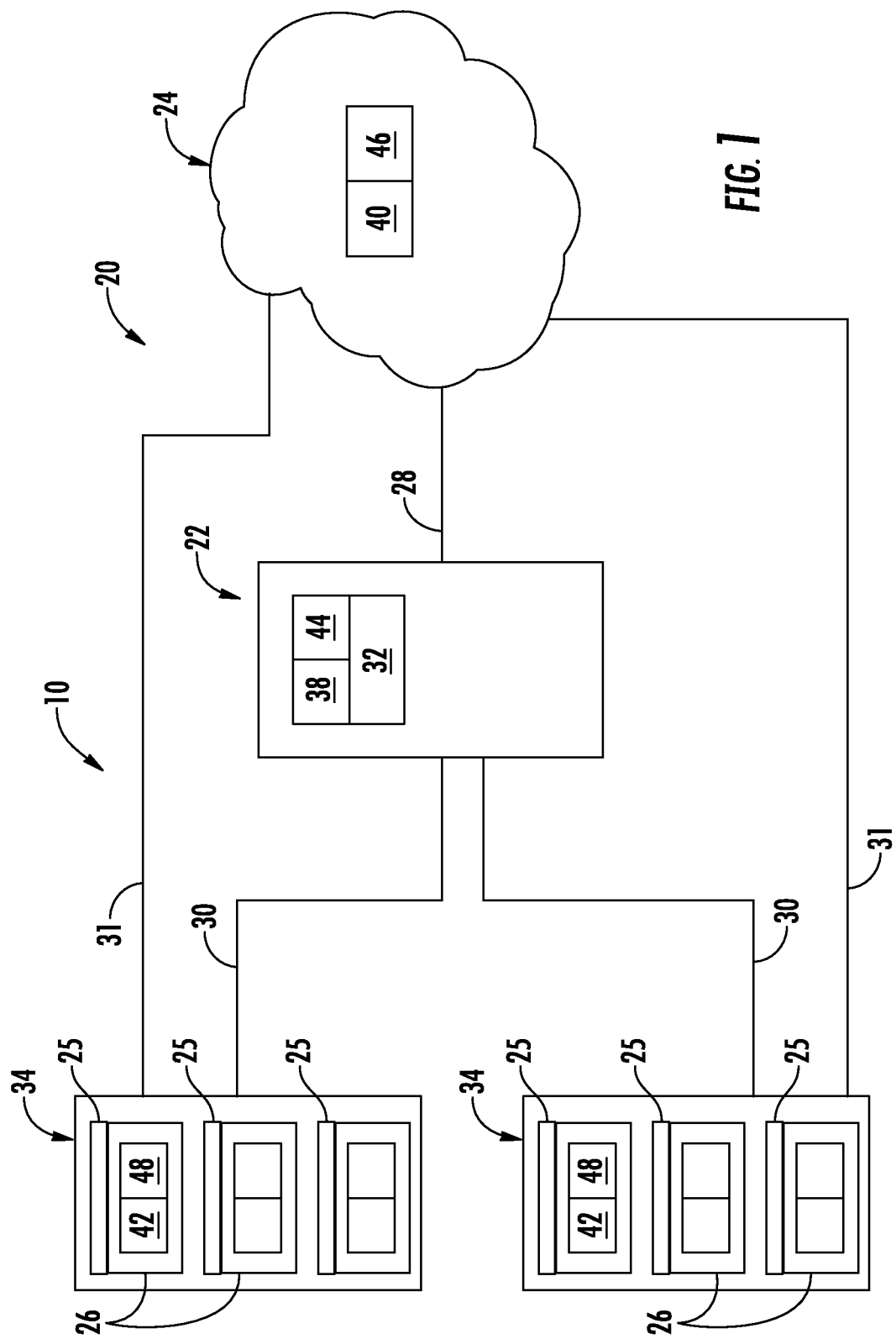
FIG. 1 is a schematic illustration of an equipment service system as one, non-limiting, exemplary embodiment of the present disclosure.

Referring to FIG. 1, an exemplary embodiment of an equipment service system 20, which may include, or may use portions of, a service tool 22, a remote server 24, and at least one equipment component 25 with at least one equipment controller 26. The service tool 22 may communicate with the remote server 24 and/or the equipment controller 26 over respective communication pathways 28, 30 when corresponding communication interfaces are enabled. The communication pathways 28, 30 may be associated with such communication protocols as Bluetooth®, Wi-Fi, Near Field Communications (NFC), infrared, mobile broadband (e.g., 3G, 4G, etc.), satellite, and others. The remote server 24 can facilitate communication between the equipment controller 26 and the service tool 22. One or more communication pathways 31 between the remote server 24 and equipment controller 26 can enable remote access, for instance, for the service tool 22 to request enablement of communication pathway 30. Thus, information can flow over communication pathways 28 and 31, and/or a direct link can be established between the equipment controller 26 and the service tool 22 using communication pathway 30 upon enablement of a wireless access interface of the equipment controller 26. Communication pathway 31 can use a different protocol for longer distance secure communication than protocols used by communication pathways 28 and 30, for example.

The service tool 22 may include a user interface 32 that facilitates system interaction with a user (e.g., an equipment repairperson/service technician). Non-limiting examples of the service tool 22 may include a smartphone, a tablet computer, laptop computer, and other electronic devices. The remote server 24 may be cloud-based (i.e., in a cloud network environment). The equipment service system 20 generally controls the flow of information between the service tool 22, the remote server 24 and/or the equipment controller 26. In some embodiments, the service tool 22 may provide an interface to one or more remotely executed applications with reduced local code execution. In one embodiment, the remote server 24 and the equipment controller 26 may be owned and/or controlled by a common company.

The equipment service system 20 may further include at least one site (i.e., two illustrated as 34, 36 in FIG. 1). Each site 34, 36 may include at least one equipment controller 26 (i.e., three illustrated for each site 34, 36) operable to control one or more equipment components 25. Non-limiting examples of sites 34, 36 may be a building, a set of floors within a building, a portion of a floor within a building, a collection of buildings, and others. A non-limiting example of an equipment controller 26 may be an elevator controller that can be serviced by the manufacturer of the elevator, and the one or more equipment components 25 can be one or more elevator components such as elevator cars. The service tool 22, the remote server 24, and the equipment controller 26 may each include respective processors 38, 40, 42 (e.g., microprocessors), and storage mediums 44, 46, 48 that may be computer writeable and readable.

In the example of FIG. 1, a service tool wireless access management system 10 can include the service tool 22 and the equipment controller 26, where various location-based operations can be distributed between either or both of the service tool 22 and the equipment controller 26. For example, at least one processor 38 of the service tool 22 can determine whether the service tool 22 is located at a predetermined service location of an equipment service system 20 and/or at least one processor 42 of the equipment controller 26 can determine/confirm the location of the service tool 22. Further, the remote server 24 may/may also determine or verify the location of the service tool 22. One or more location determination techniques can be employed, such as use of global positioning system (GPS) data, network address information, and proximity detection, etc. The predetermined service location can be defined in terms of being "local" or "remote", e.g., at one of the sites 34, 36 or not at one of the sites 34, 36. For instance, if the service tool 22 is locally at site 34, then the service tool 22 may be considered remote from site 36. "Local" can be defined being on-site (e.g., within a building) or proximate to a specific predetermined location within and/or near the site, depending upon the technology used. For instance, "local" can be defined as being within signal communication range for direct wireless communication of the wireless communication protocol used, such as Wi-Fi. In one embodiment, "local" can be defined as being within a specific geospatial area (e.g., certain GPS coordinates, certain cellular triangulation area, etc.). "Remote" can be defined as an off-site location or out of wireless transmission range. The remote server 24 can be used to enable wireless access at sites 34, 36 for the service tool 22 and may provide authentication services.

Figure 2:
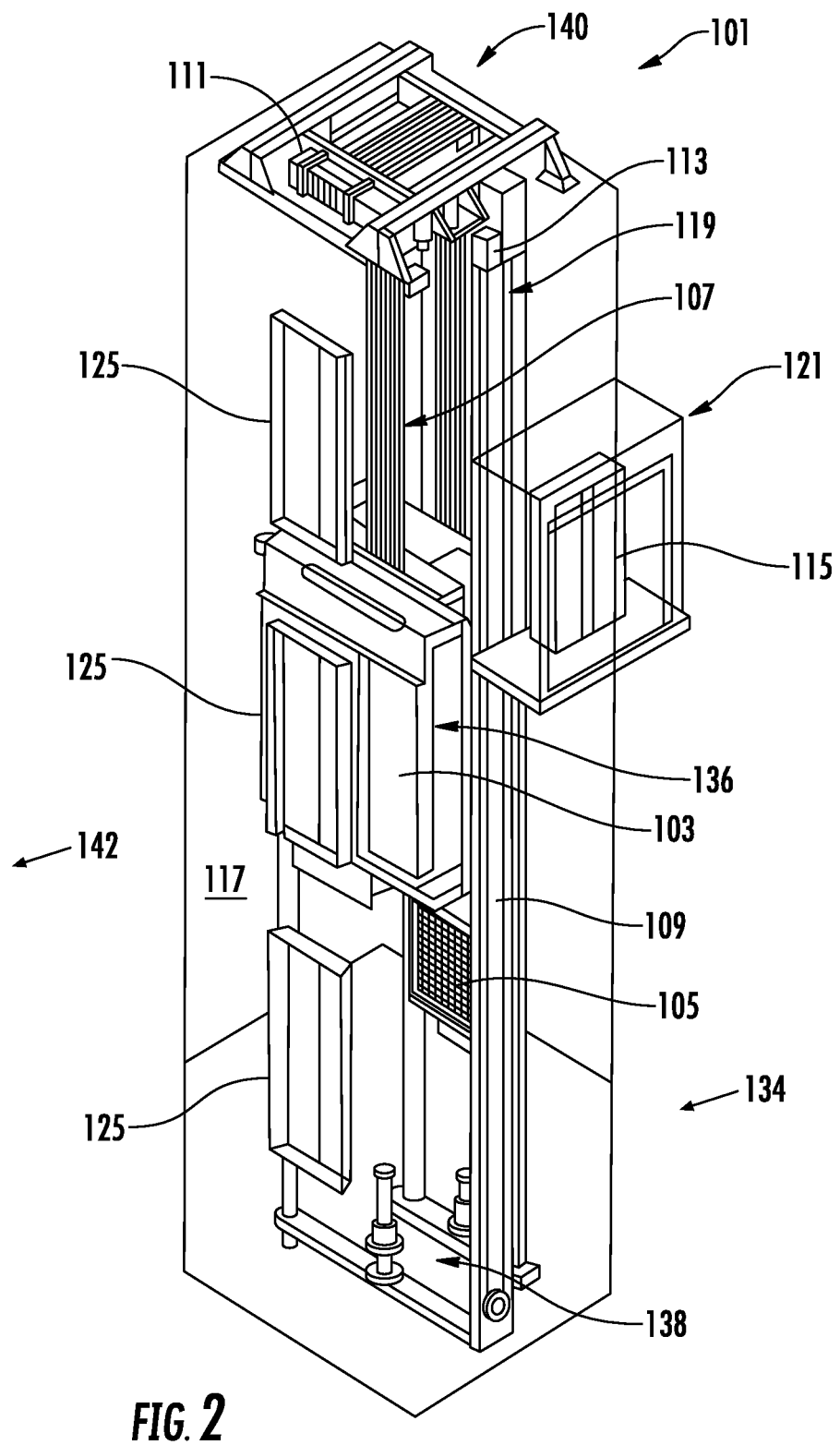
FIG. 2 is a schematic illustration of an elevator system that may employ various embodiments of the present disclosure.

FIG. 2 is a perspective view of an elevator system 101 including an elevator car 103, a counterweight 105, one or more load bearing members 107, a guide rail 109, a machine 111, a position encoder 113, and an elevator controller 115. The elevator system 101 includes examples of various equipment components 25 of FIG. 1 and predetermined service locations (e.g., a general onsite location 134, at various landings 125, at a location 136 within elevator car 103, at a location 140 proximate to machine 111, at a pit location 138, in controller room 121, or any other desired location), where the elevator controller 115 is an example of the equipment controller 26 of FIG. 1. For instance, the onsite location 134 can be within a building/structure that includes the elevator system 101, while an offsite location 142 can be external to the building/structure that includes the elevator system 101.

In the example of FIG. 2, the elevator car 103 and counterweight 105 are connected to each other by the load bearing members 107. The load bearing members 107 may be, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109. The load bearing members 107 engage the machine 111, which is part of an overhead structure of the elevator system 101. The machine 111 is configured to control movement between the elevator car 103 and the counterweight 105. The position encoder 113 may be mounted on an upper sheave of a speed-governor system 119 and may be configured to provide position signals related to a position of the elevator car 103 within the elevator shaft 117. In other embodiments, the position encoder 113 may be directly mounted to a moving component of the machine 111, or may be located in other positions and/or configurations as known in the art.

The elevator controller 115 can be located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position encoder 113. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located, distributed between, and/or configured in other locations or positions within the elevator system 101. In some embodiments, the elevator controller 115 can be configured to control features within the elevator car 103, including, but not limited to, lighting, display screens, music, spoken audio words, etc.

The machine 111 may include a motor or similar driving mechanism and an optional braking system. In accordance with embodiments of the disclosure, the machine 111 is configured to include an electrically driven motor. The power supply for the motor may be any power source, including a power grid, which, in combination with other components, is supplied to the motor. Although shown and described with a rope-based load bearing system, elevator systems that employ other methods and mechanisms of moving an elevator car within an elevator shaft, such as hydraulics, ropeless, or any other methods, may employ embodiments of the present disclosure. FIG. 2 is merely a non-limiting example presented for illustrative and explanatory purposes.

Figure 3:
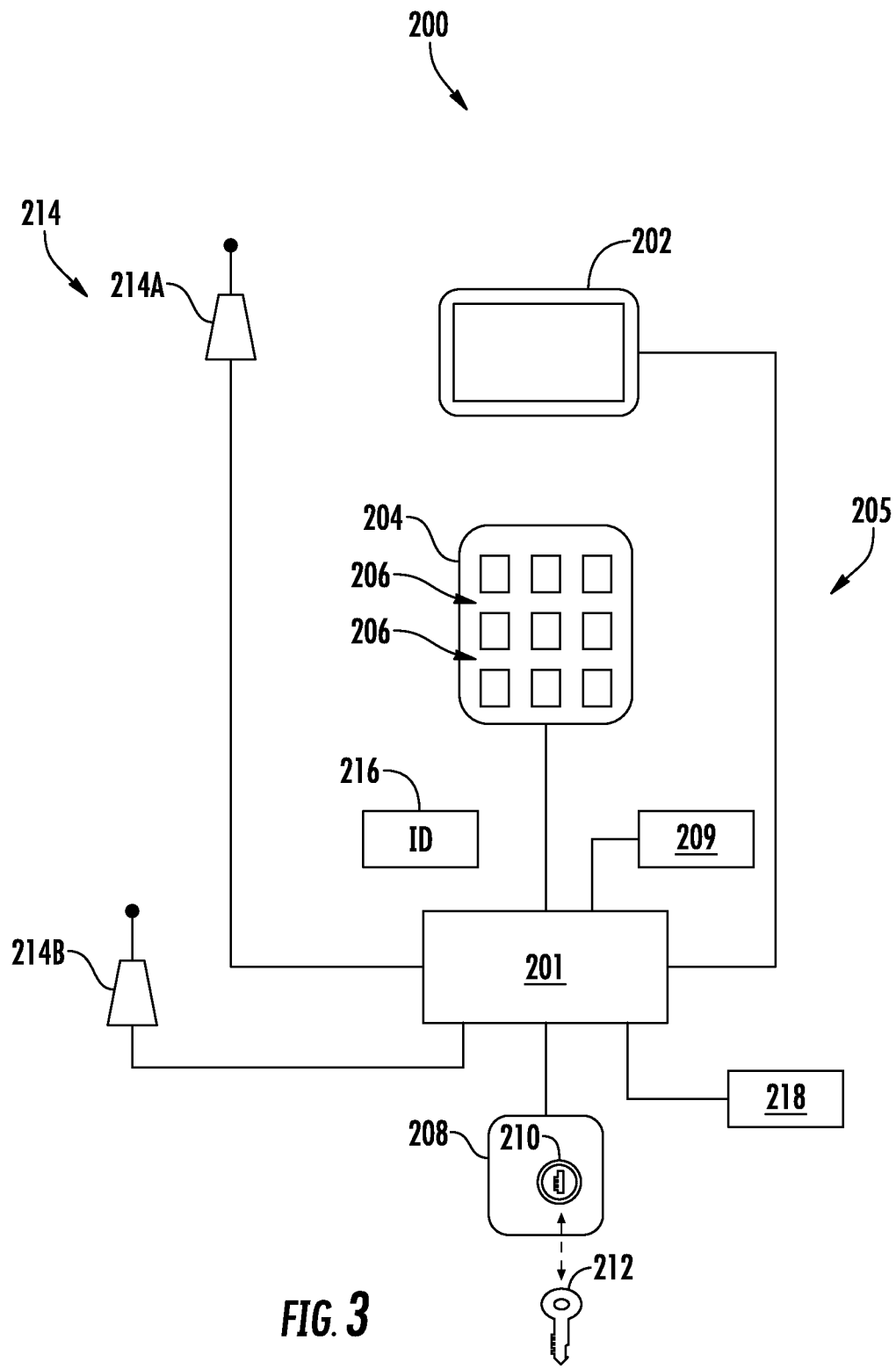
FIG. 3 is a schematic illustration of user and communication interfaces of an equipment controller in accordance with an embodiment of the present disclosure.

FIG. 3 depicts an example of interfaces 200 of the equipment controller 26 of FIG. 1 that can be used to establish a wireless communication session with the service tool 22 of FIG. 1. One or more instances of the interfaces 200 can be installed at each site 34, 36 to serve various purposes during a primary operating mode (e.g., normal operation) and one or more auxiliary operating modes (e.g., service mode, inspection mode, error state modes, etc.), including enabling and disabling wireless communication upon transitions between modes or within modes. For instance, the interfaces 200 can be located in whole or in part within the elevator car 103 of FIG. 2 as part of an elevator control interface. Further, the interfaces 200 can be located at one or more of the landings 125 of FIG. 2, in controller room 121 of FIG. 2, and/or at other locations. The interfaces 200 can provide various inputs and/or outputs to equipment controller 26 of FIG. 1. For example, the interfaces 200 can include a display 202, an input interface 204 including a plurality of buttons 206, a restricted-access input interface 208, a scanner interface 209, and at least one wireless access interface 214. In some embodiments, the display 202 is touch-sensitive and operable to receive user inputs. The display 202, input interface 204, restricted-access input interface 208, and/or scanner interface 209 are collectively referred to as user interfaces 205. The restricted-access input interface 208 can include an access control 210, such as a lock, operable to restrict input unless an associated key 212 is used (e.g., a fire key switch). The restricted-access input interface 208 may be used to transition between a primary operating mode and an auxiliary operating mode. The scanner interface 209 can include a camera, a radio-frequency identification (RFID) transceiver, a barcode reader, a fingerprint reader, and/or similar interface operable to detect information about a user. For instance, the scanner interface 209 can identify an authorized user/user type based on an identification card/device, biometric data, and/or other observable information. An interface controller 201 can process inputs and outputs of the interfaces 200 as a data concentrator of the equipment controller 26. For example, the interfaces 200 can be integrated into the elevator car 103 of FIG. 2, while all or a portion of the equipment controller 26 of FIG. 1 may be located in the elevator controller 115 at controller room 121. The interface controller 201 can also detect the presence of a user through one or more sensors 218, such as door/gate sensors, load sensors, thermal sensors, audio sensors, and/or other types of sensors known in the art. Input from the input interface 204, scanner interface 209, and/or sensors 218 may also or alternatively be used to transition between the primary operating mode and the auxiliary operating mode based on a condition detected.

Figure 4:
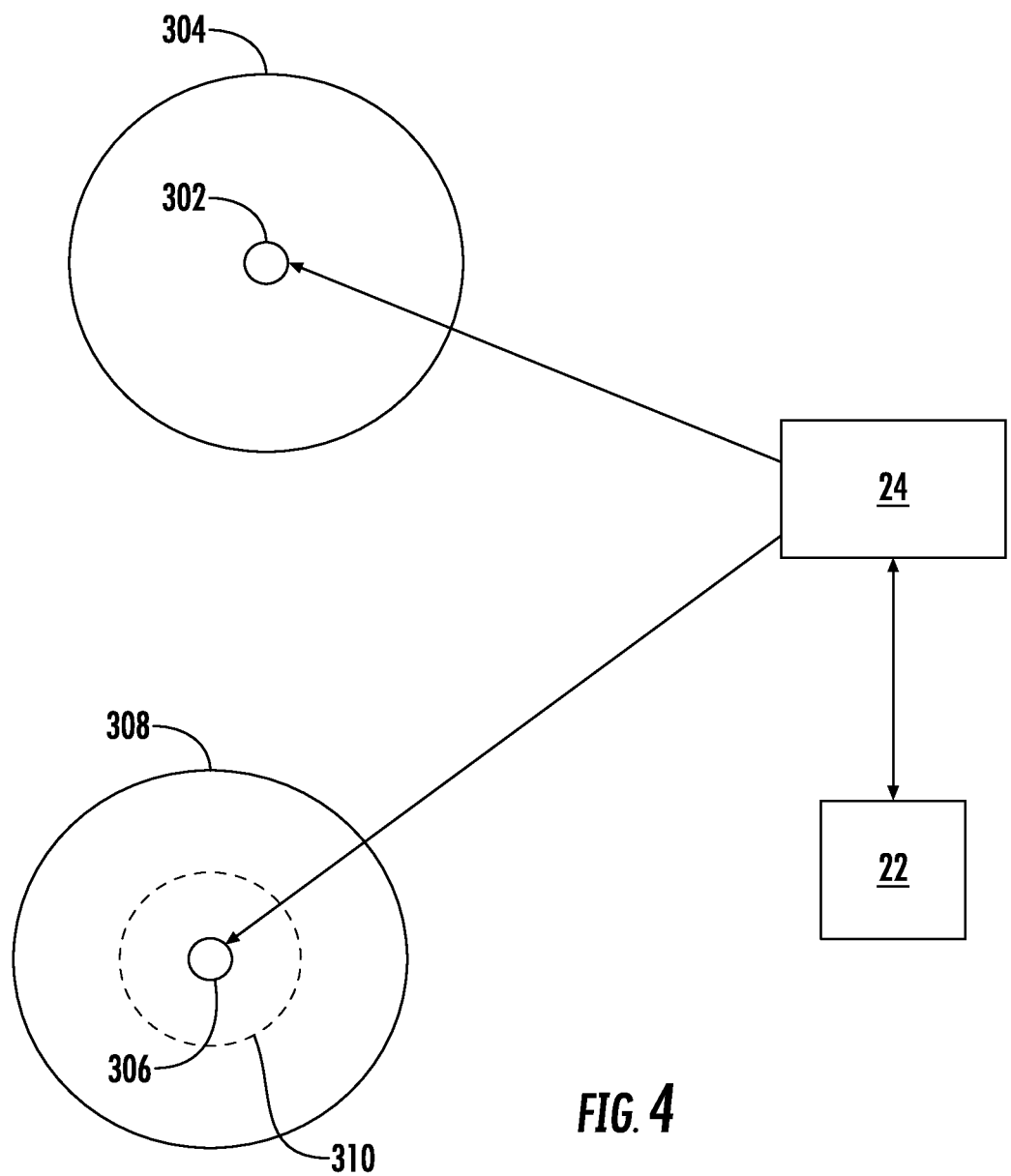
FIG. 4 is a schematic illustration of communication range thresholds in accordance with an embodiment of the present disclosure.

The wireless access interface 214 can be used to establish various types of wireless communication, such as the communication pathway 30 of FIG. 1. In some embodiments, there are multiple instances of the wireless access interface 214 that may have different communication ranges, as further illustrated in conjunction with FIG. 4. For instance, embodiments may have a single communication range threshold 304 defined relative to a location 302 of the wireless access interface 214. Other embodiments can include a first communication range threshold 308 for a first wireless access interface 214A and a second communication range threshold 310 for a second wireless access interface 214B at a location 306, where the second wireless access interface 214B has a reduced wireless communication range relative to the first wireless access interface 214A (as indicated by a smaller diameter of the second communication range threshold 310 relative to the first communication range threshold 308). For instance, the first wireless access interface 214A may be a Wi-Fi interface, while the second wireless access interface 214B may be a Bluetooth® or NFC communication interface. The communication range thresholds 304, 308, 310 can be used to check/ensure proximity with respect to the service tool 22. For example, in some embodiments, the wireless access interface 214 is not enabled until the service tool 22 is within the communication range threshold 304 at location 302, which may be confirmed by GPS coordinates provided from the service tool 22 to the remote server 24. In some embodiments, the first wireless access interface 214A is not enabled until the service tool 22 is within the second communication range threshold 310. The second wireless access interface 214B may use less power than the first wireless access interface 214A, and selectively enabling/disabling the first wireless access interface 214A reduces overall power consumption and can reduce exposure to potential cybersecurity threats. The communication range thresholds 304, 308 can also be used to determine when to disable wireless access interfaces 214, 214A, such as within a timeout period elapsing since the service tool 22 was last within the communication range thresholds 304, 308.

Figure 5:
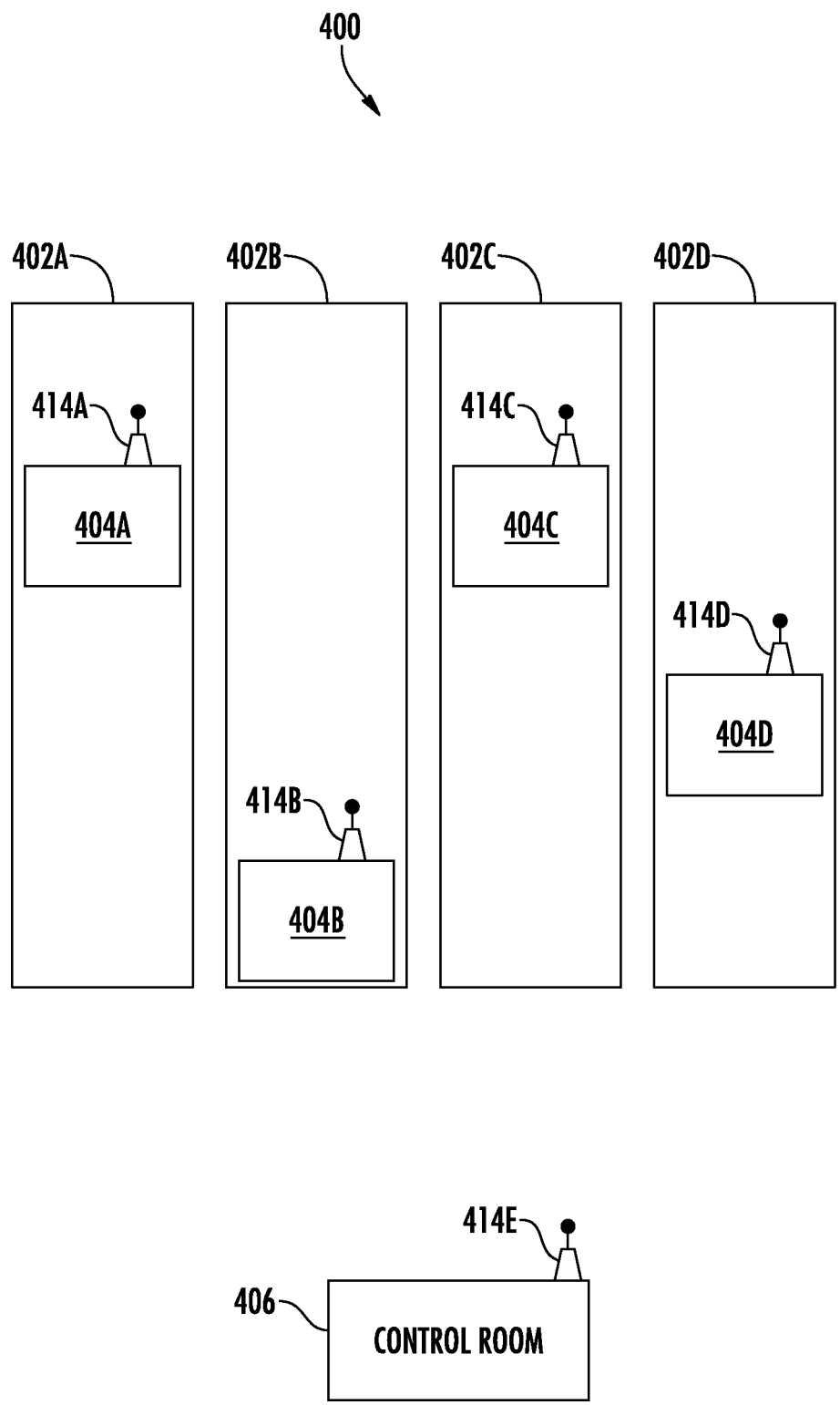
FIG. 5 is a schematic illustration of wireless access interfaces at various positions in accordance with an embodiment of the present disclosure.

With further reference to FIG. 3, an identifier 216 can be associated with the interfaces 200 and a corresponding equipment controller 26 of FIG. 1. The identifier 216 can be an alpha-numeric code or symbol (e.g., a bar code or quick response code) that identifies a location of the wireless access interface 214 to be accessed. In some embodiments, a user of the service tool 22 can photograph, scan, or manually input information associated with the identifier 216 to target communication with a specific instance of the wireless access interface 214, for instance, where multiple other wireless access interfaces 214 are also in close physical proximity to the service tool 22. Where the identifier 216 is used, a wireless access request from the service tool 22 can include a request identifier, and enablement of the wireless access interface 214 can be conditioned on determining that the request identifier matches the identifier 216 associated with the equipment controller 26. As depicted in the example of FIG. 5, a location may include an elevator bank 400 include elevator shafts 402A, 402B, 402C, 402D with corresponding elevator cars 404A, 404B, 404C, 404D, a control room 406, and corresponding wireless access interfaces 414A, 414B, 414C, 414D, 414E as instances of wireless access interface 214. The use of identifiers, such as identifier 216 of FIG. 3, can ensure that a user of the service tool 22 is interfacing with the desired target, where wireless access interfaces 414A-414E may have an overlapping communication range, particularly when the elevator cars 404A-404D are at or near a same height within elevator shafts 402A-402D.

Entering inputs directly through the user interfaces 205 of FIG. 3 can also be used to selectively enable or confirm enablement of a wireless access interface. For example, each of the elevator cars 404A-404D and control room 406 may have instances of the user interfaces 205. A sequence or combination of pressing buttons 206, using key 212 on restricted-access input interface 208, and/or making touch-based inputs through display 202 at a particular location can enable or confirm enablement of one or more of the wireless access interfaces 414A-414E of FIG. 5. As an example, the service tool 22 may request enablement of the wireless access interfaces 414A-414E, and entry of a code or sequence through user interfaces 205 at elevator car 404B may result in keeping wireless access interface 414B enabled while disabling wireless access interfaces 414A and 414C-414E.

In the example of FIG. 5, the wireless access interfaces 414A-414E are normally disabled to conserve power and/or reduce exposure to cyberattacks. Alternatively or in addition to requesting enablement of one or more of the wireless access interfaces 414A-414E through the service tool 22, the user can push one or more of the buttons 206 of FIG. 3 or a press/toggle a switch to enable or confirm enablement of one or more of the wireless access interfaces 414A-414E. For instance, a combination of button 206 pushes could include simultaneously pushing a combination of buttons 206 for at least a minimum time period and/or entering a predetermined sequence. In some embodiments, the service tool 22 receives a code from the remote server 24 indicating the needed combination or sequence. Similarly, in addition to requesting enablement of one or more of the wireless access interfaces 414A-414E through the service tool 22 or to confirm user presence, the scanner interface 209 can be used to capture scanned user data, such as an RFID-enabled card, a barcode on an identification card or work order, and/or biometric data of an authorized user. In some embodiments, upon enablement of one of the wireless access interfaces 414A-414E, other instances of the wireless access interfaces 414A-414E are enabled. For instance, if a user of the service tool 22 enables the wireless access interface 414E, the remote server 24 or other system may also enable wireless access interfaces 414A-414D. Various wireless communication termination events can result in disabling one or more of the wireless access interfaces 414A-414E as further described in reference to FIG. 6.

Figure 6:
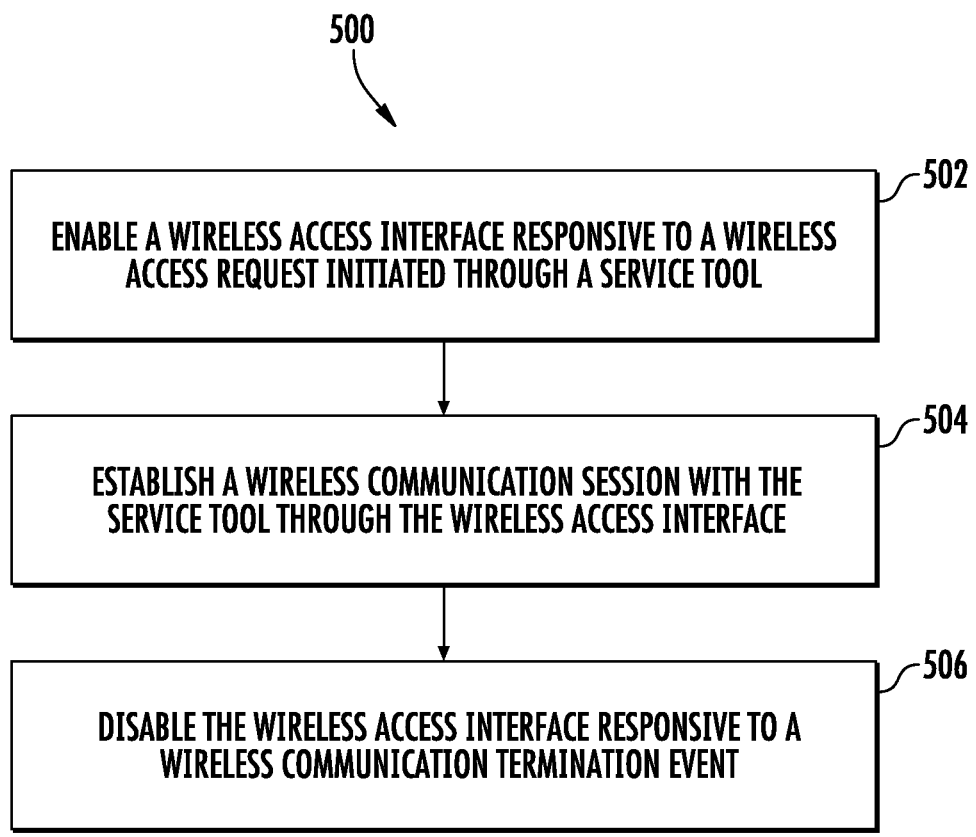
FIG. 6 is a flowchart illustrating a method of service tool wireless access management in accordance with an embodiment of the present disclosure.

FIG. 6 depicts a process 500 that can be performed by the service tool wireless access management system 10 of FIG. 1 as shown and described herein and/or by variations thereon. Various aspects of the process 500 can be carried out using one or more sensors, one or more processors, and/or one or more machines and/or controllers. For example, some aspects of the flow process involve sensors (e.g., GPS, cameras, etc.), as described above, in communication with a processor or other control device and transmit detection information thereto. The process 500 is described in reference to FIGS. 1-6.

At block 502, at least one processor 38, 40, 42 of the service tool wireless access management system 10 (e.g., at an equipment component 25) enables a wireless access interface 214 responsive to a wireless access request initiated through a service tool 22. The wireless access request can be relayed from the service tool 22 through a remote server 24 to the at least one processor via one or more communication pathways 28, 31. The service tool wireless access management system 10 can include a plurality of equipment components 25 and equipment controllers 26 having an associated instance of the wireless access interface 214 (e.g., wireless access interfaces 414A-414E) enabled responsive to the wireless access request. The wireless access interface 214 can be a first wireless access interface 214A of the equipment controller 26, and the wireless access request can be received on a second wireless access interface 214B of the equipment controller 26, where the second wireless access interface 214B has a reduced wireless communication range relative to the first wireless access interface 214A. The at least one processor can be further configured to enable the wireless access interface 214 responsive to an input received at a user interface 205 of the equipment controller 26. The at least one processor can be configured to confirm a location of the service tool 22 within a communication range threshold 304 of the wireless access interface 214 before enabling the wireless access interface 214. The wireless access request can include a request identifier, and enablement of the wireless access interface 214 may be further conditioned on determining that the request identifier matches an identifier 216 associated with the equipment controller 26.

At block 504, at least one processor of the service tool wireless access management system 10 establishes a wireless communication session with the service tool 22 through the wireless access interface 214. The wireless communication session can provide the service tool 22 with access to one or more functions of an elevator controller 115. Functions can include monitoring of performance parameters, modifying performance parameters, change performance aspects, entering a test/diagnostic mode, and other such actions.

At block 506, at least one processor of the service tool wireless access management system 10 disables the wireless access interface 214 responsive to a wireless communication termination event. The wireless communication termination event can be one or more of: a timeout period elapsing between enabling the wireless access interface 214 and establishing the wireless communication session, detecting that the service tool 22 is outside of a communication range threshold 304 of the wireless access interface 214, a timeout period elapsing since a last completed communication of the wireless communication session, a disable command received from the service tool, and an operating mode transition to a primary operating from an auxiliary operating mode. The wireless access interface 214 can be enabled responsive to a transition of the equipment controller 26 from the primary operating mode to the auxiliary operating mode.

Process 500 can be repeated periodically to confirm whether a change in location of the service tool 22 necessitates a change in enablement of the wireless access interface 214. For example, the process 500 can be repeated every N minutes, hourly, or at any other suitable period. In some embodiments, the process 500 repeats at a faster rate when the service tool 22 transitions from an offsite location 142 to an onsite location 134.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A service tool wireless access management system comprising:
   a wireless access interface; and
   an equipment controller of an equipment service system comprising at least one processor configured to:
      enable the wireless access interface responsive to a wireless access request initiated through a service tool, wherein enabling the wireless access interface comprises powering the wireless access interface, and the wireless access request is relayed from the service tool through a remote server to the at least one processor via one or more communication pathways, the remote server providing an authentication service prior to the wireless access interface being enabled;
      establish a wireless communication session with the service tool through the wireless access interface, wherein the equipment controller comprises an elevator controller, and the wireless communication session provides the service tool with access to one or more functions of the elevator controller; and
      disable the wireless access interface responsive to a wireless communication termination event, wherein disabling the wireless access interface comprises depowering the wireless access interface.

2. The service tool wireless access management system set forth in claim 1, further comprising a plurality of equipment components of the equipment service system having an associated instance of the wireless access interface enabled responsive to the wireless access request.

3. The service tool wireless access management system set forth in claim 1, wherein the wireless access interface comprises a first wireless access interface of the equipment controller, and the wireless access request is received on a second wireless access interface of the equipment controller, the second wireless access interface having a reduced wireless communication range relative to the first wireless access interface.

4. The service tool wireless access management system set forth in claim 1, wherein the at least one processor is further configured to enable the wireless access interface responsive to an input received at a user interface of the equipment controller.

5. The service tool wireless access management system set forth in claim 1, wherein a location of the service tool within a communication range threshold of the wireless access interface is confirmed before enabling the wireless access interface.

6. The service tool wireless access management system set forth in claim 1, wherein the wireless communication termination event comprises one or more of: a timeout period elapsing between enabling the wireless access interface and establishing the wireless communication session, detecting that the service tool is outside of a communication range threshold of the wireless access interface, a timeout period elapsing since a last completed communication of the wireless communication session, a disable command received from the service tool, and an operating mode transition to a primary operating from an auxiliary operating mode of the equipment controller.

7. The service tool wireless access management system set forth in claim 6, wherein the wireless access interface is enabled responsive to a transition of the equipment controller from the primary operating mode to the auxiliary operating mode, wherein the transition is based on a condition detected at one or more of: an input interface, a restricted-access interface, a scanner interface, and at least one sensor.

8. The service tool wireless access management system set forth in claim 1, wherein the wireless access request comprises a request identifier, and enablement of the wireless access interface is further conditioned on determining that the request identifier matches an identifier associated with the equipment controller.

9. A method of service tool wireless access management comprising:
   enabling a wireless access interface of an equipment service system responsive to a wireless access request initiated through a service tool, wherein enabling the wireless access interface comprises powering the wireless access interface, and the wireless access request is relayed from the service tool through a remote server to at least one processor of an equipment controller of the equipment service system via one or more communication pathways, the remote server providing an authentication service prior to the wireless access interface being enabled;

establishing a wireless communication session with the service tool through the wireless access interface;

providing the service tool with access to one or more functions of an elevator controller of the equipment service system through the wireless communication session; and disabling the wireless access interface responsive to a wireless communication termination event, wherein disabling the wireless access interface comprises depowering the wireless access interface.

10. The method set forth in claim 9, further comprising enabling an associated instance of the wireless access interface of a plurality of equipment components of the equipment service system responsive to the wireless access request.

11. The method set forth in claim 9, wherein the wireless access interface comprises a first wireless access interface of the equipment controller, and the method further comprises receiving the wireless access request on a second wireless access interface of the equipment controller, the second wireless access interface having a reduced wireless communication range relative to the first wireless access interface.

12. The method set forth in claim 9, further comprising:
enabling the wireless access interface responsive to an input received at a user interface of the equipment controller of the equipment service system.

13. The method set forth in claim 9, further comprising:
confirming a location of the service tool within a communication range threshold of the wireless access interface before enabling the wireless access interface.

14. The method set forth in claim 9, wherein the wireless communication termination event comprises one or more of: a timeout period elapsing between enabling the wireless access interface and establishing the wireless communication session, detecting that the service tool is outside of a communication range threshold of the wireless access interface, a timeout period elapsing since a last completed communication of the wireless communication session, a disable command received from the service tool, and an operating mode transition to a primary operating from an auxiliary operating mode of the equipment controller of the equipment service system.

15. The method set forth in claim 14, further comprising:
enabling the wireless access interface responsive to a transition of the equipment controller from the primary operating mode to the auxiliary operating mode, wherein the transition is based on a condition detected at one or more of: an input interface, a restricted-access interface, a scanner interface, and at least one sensor.

16. The method set forth in claim 9, wherein the wireless access request comprises a request identifier, and enablement of the wireless access interface is further conditioned on determining that the request identifier matches an identifier associated with the equipment controller of the equipment service system.

* * * * *